March 23, 1954     H. R. FREUND     2,672,795
PORTABLE PHOTOCOMPOSING APPARATUS
Filed July 20, 1951     12 Sheets-Sheet 1
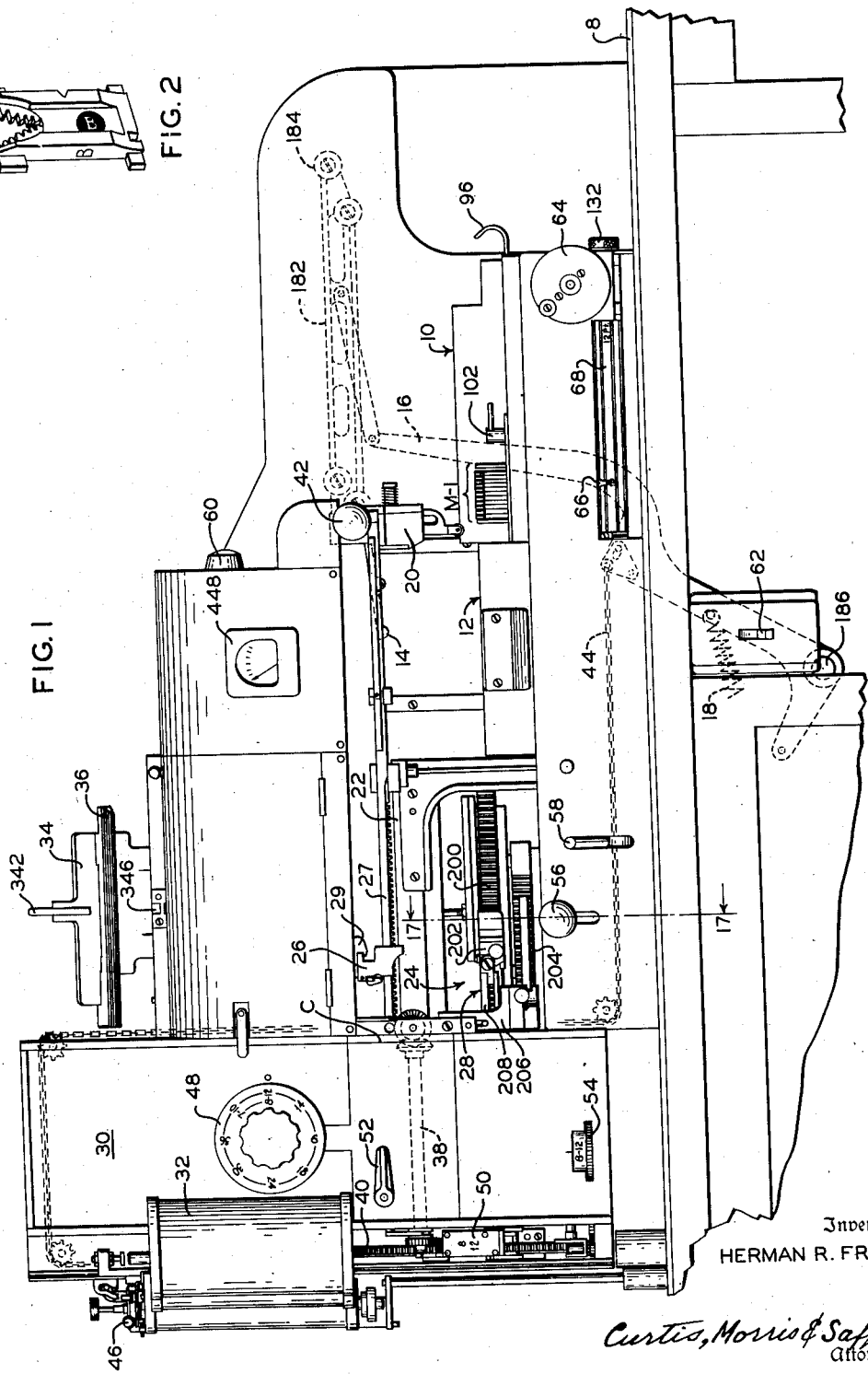
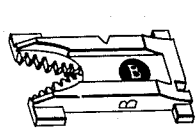
Inventor
HERMAN R. FREUND
Curtis, Morris & Safford
Attorneys

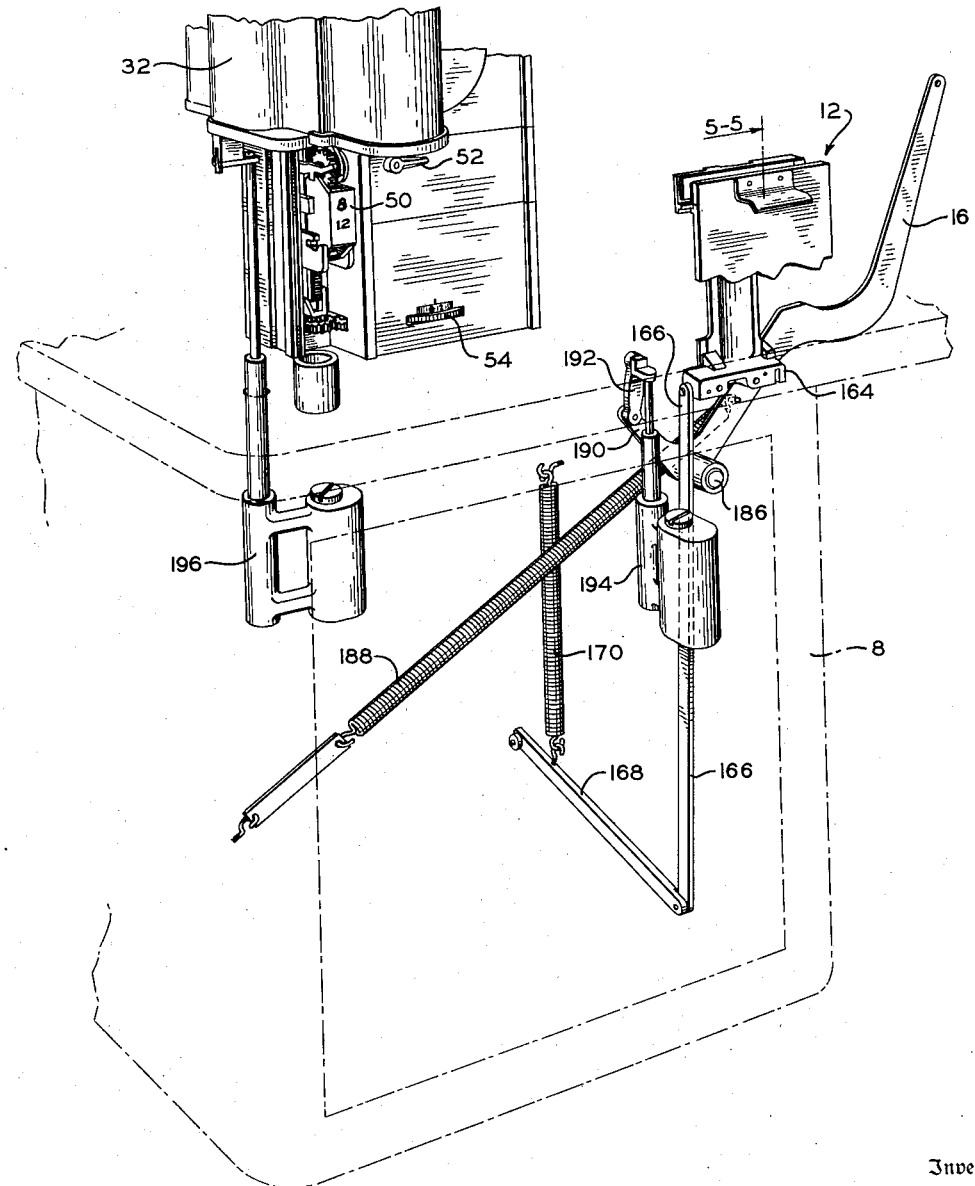

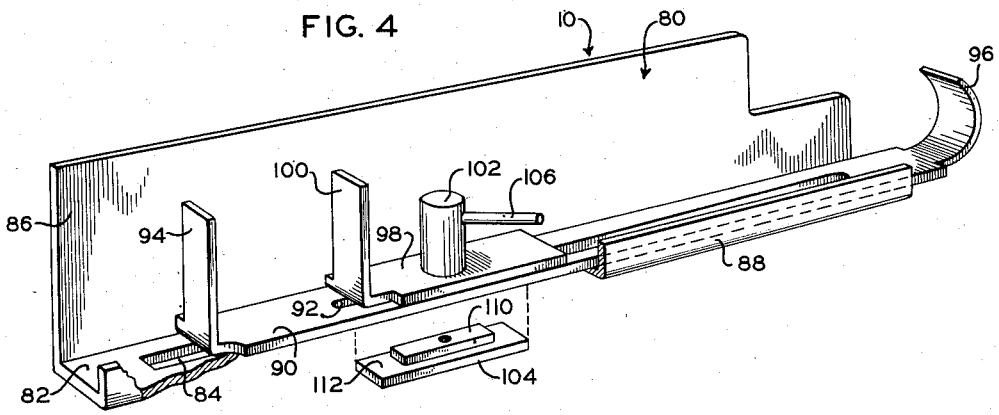
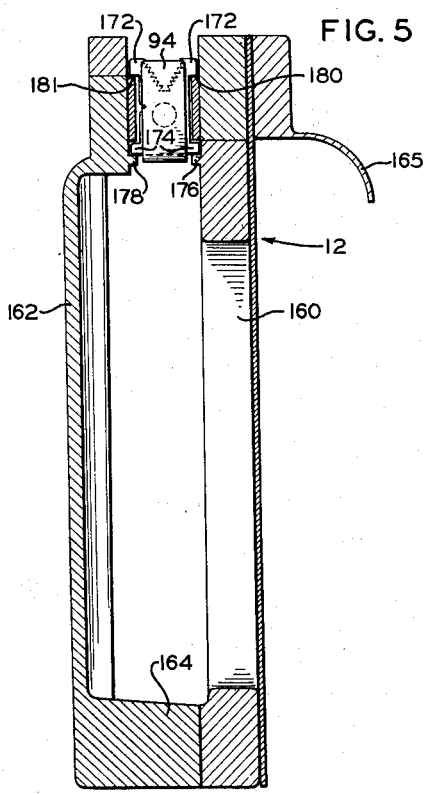
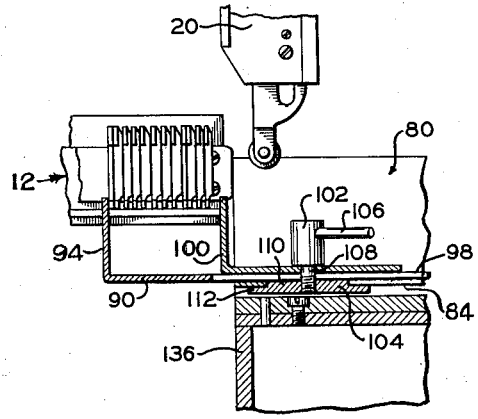

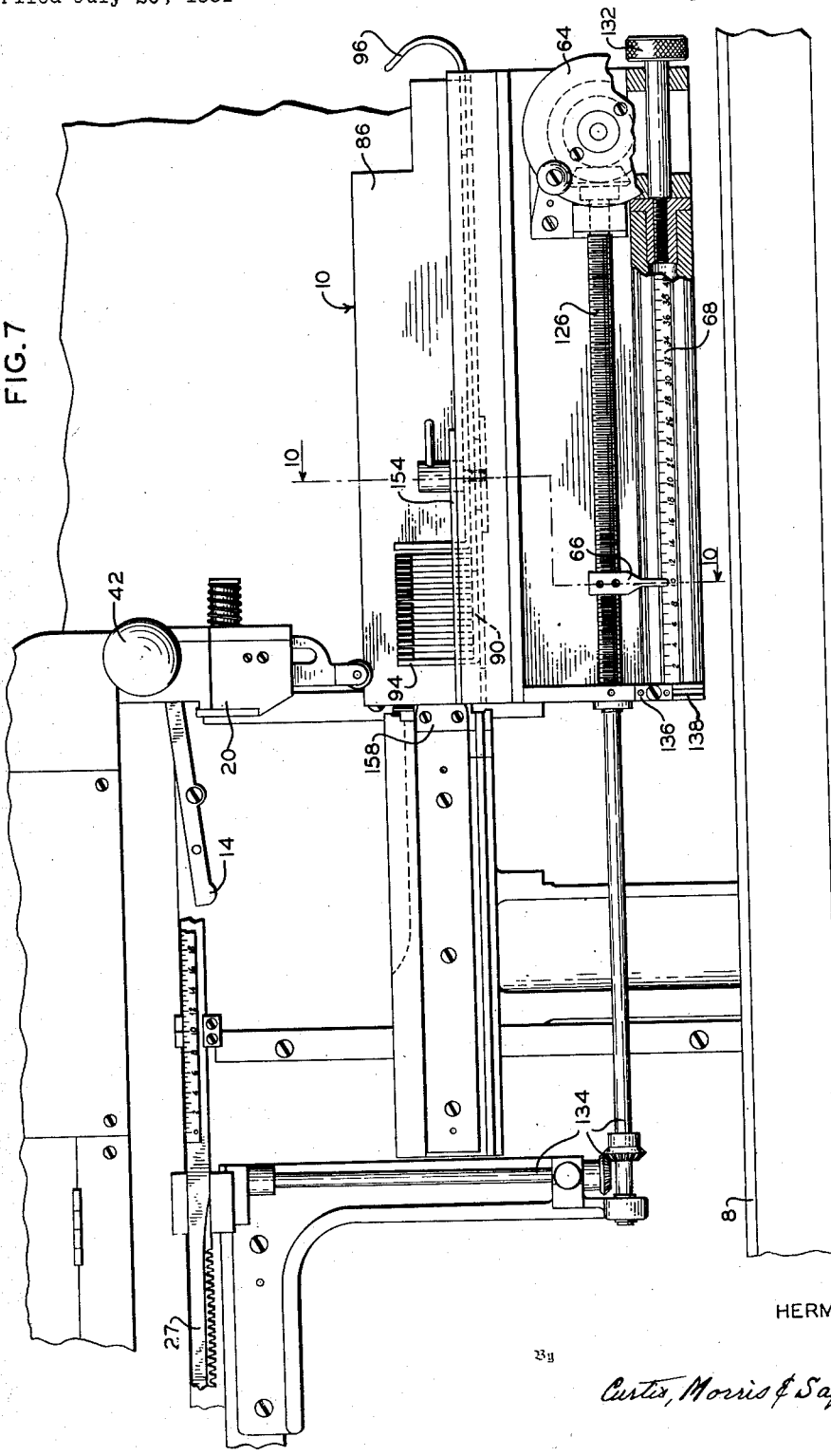

March 23, 1954 H. R. FREUND 2,672,795
PORTABLE PHOTOCOMPOSING APPARATUS
Filed July 20, 1951 12 Sheets-Sheet 5
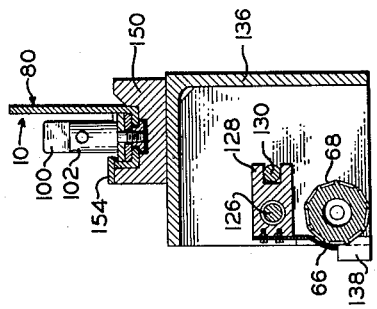
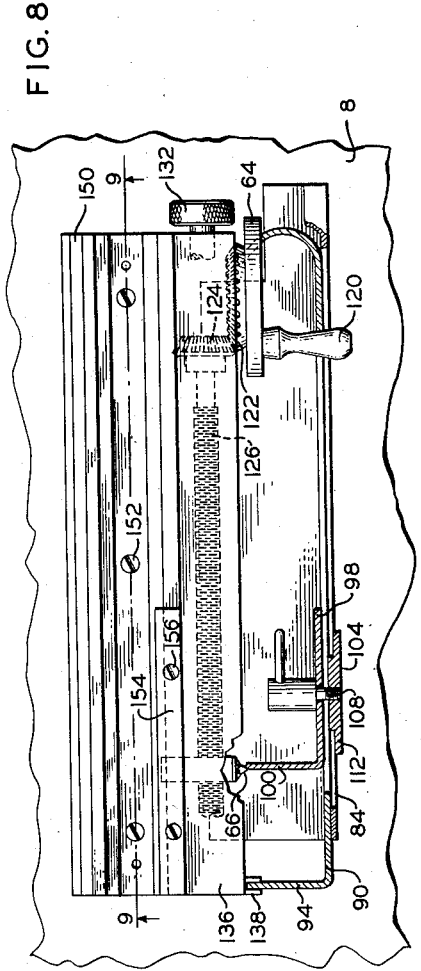
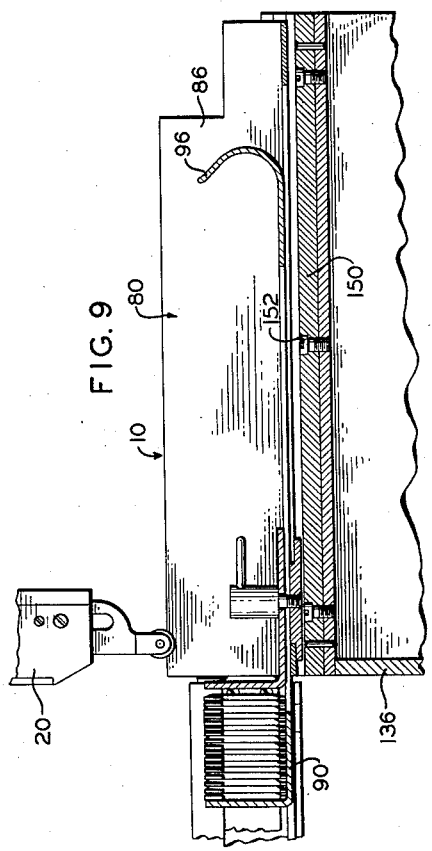
Inventor
HERMAN R. FREUND
By
Curtis, Morris & Safford
Attorneys

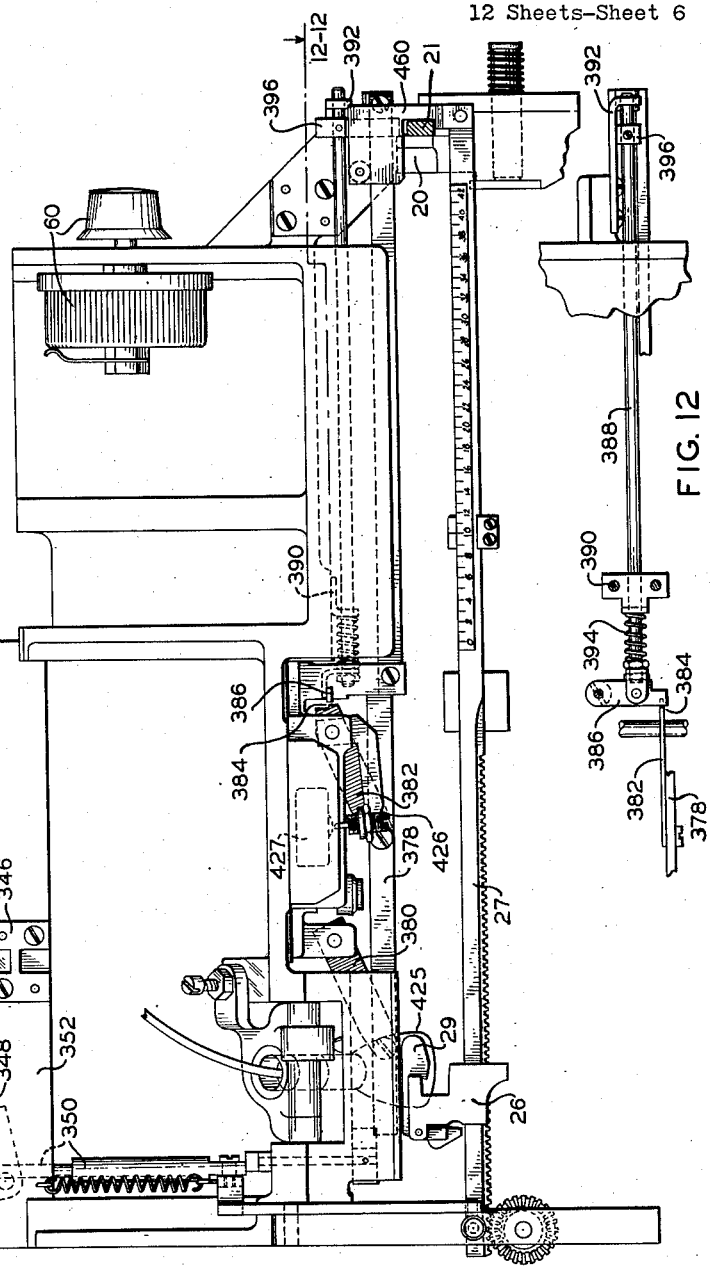

March 23, 1954 H. R. FREUND 2,672,795
PORTABLE PHOTOCOMPOSING APPARATUS
Filed July 20, 1951 12 Sheets-Sheet 7
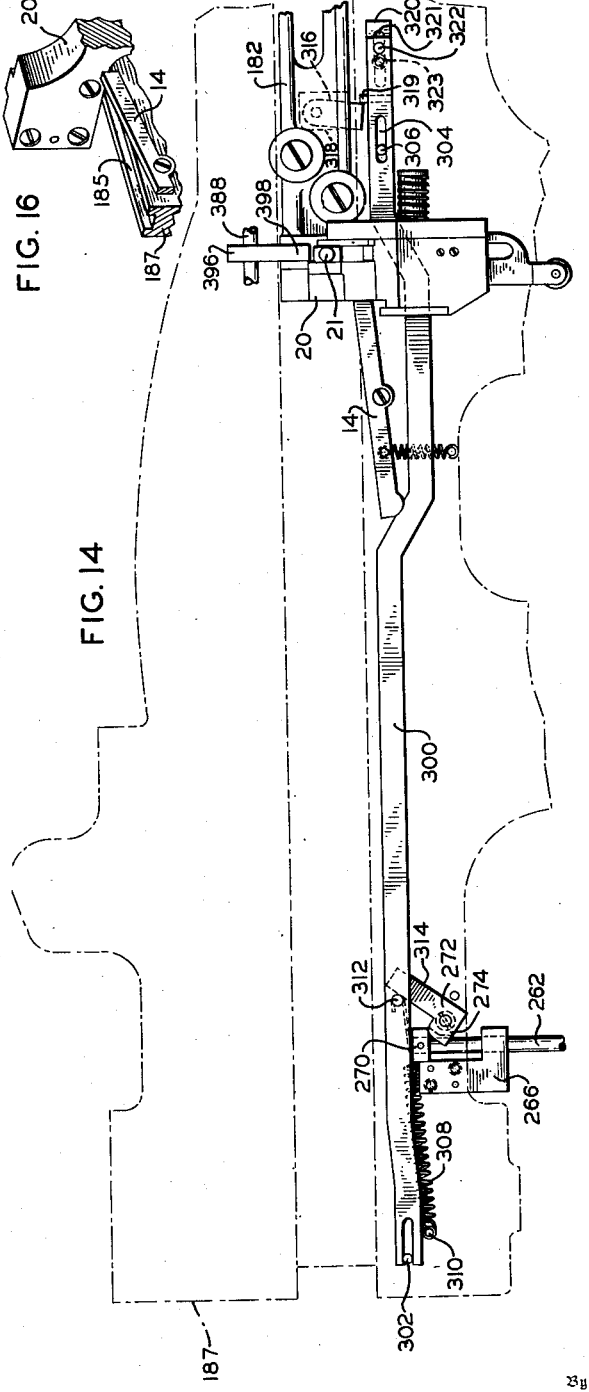
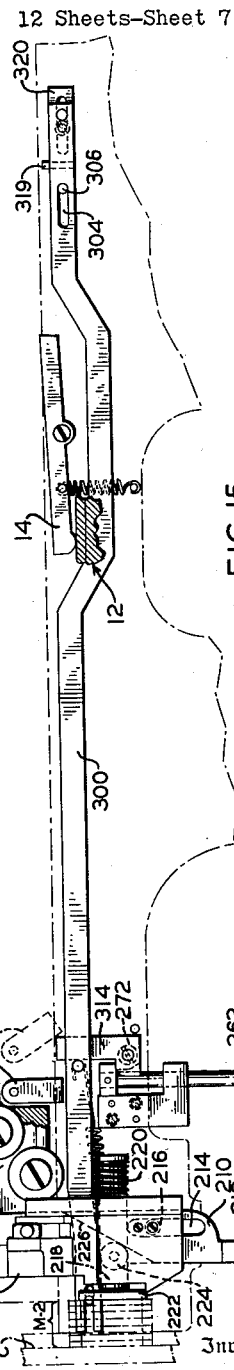
Inventor
HERMAN R. FREUND
By
Curtis, Morris & Safford
Attorneys

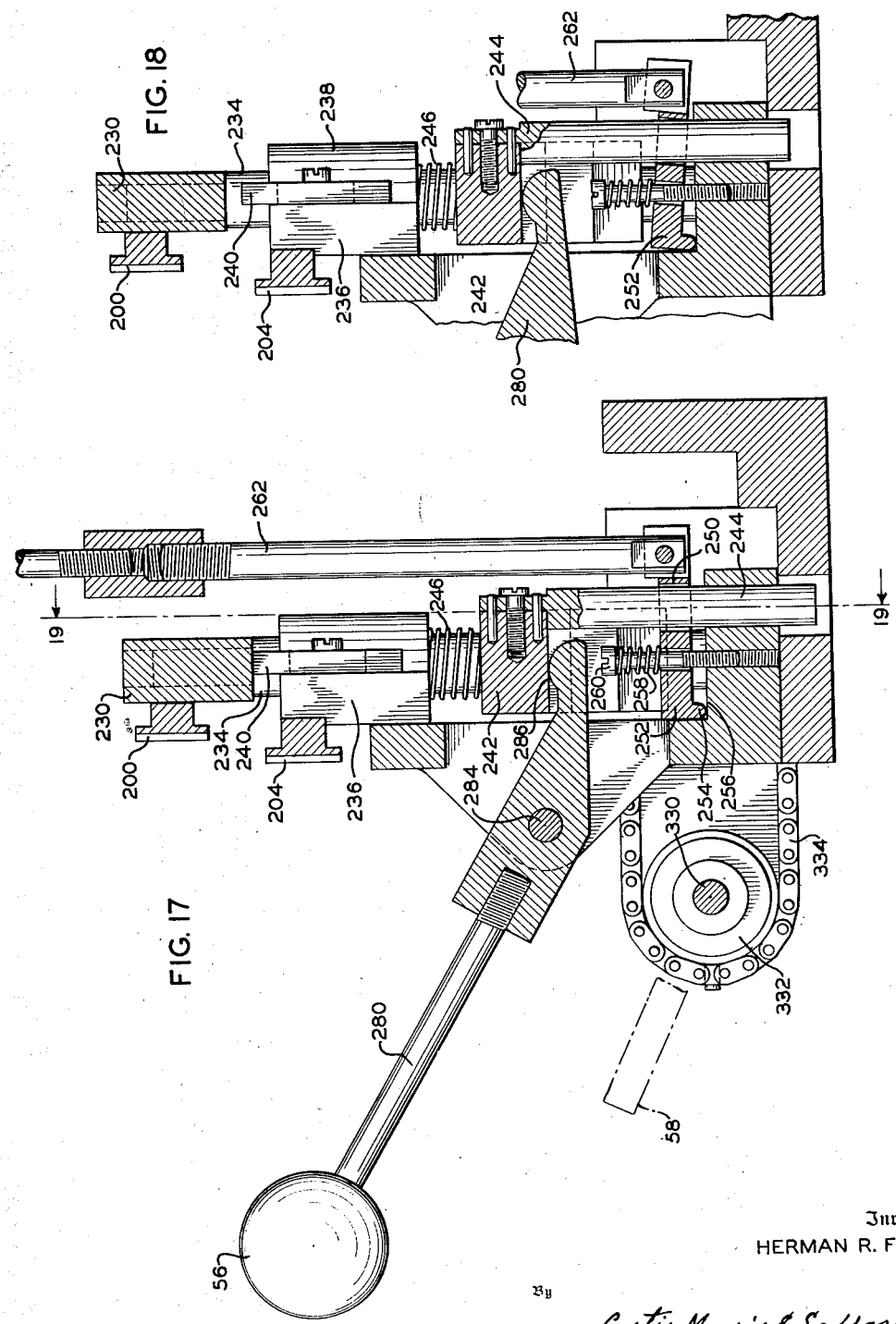

March 23, 1954     H. R. FREUND     2,672,795
PORTABLE PHOTOCOMPOSING APPARATUS
Filed July 20, 1951     12 Sheets-Sheet 9
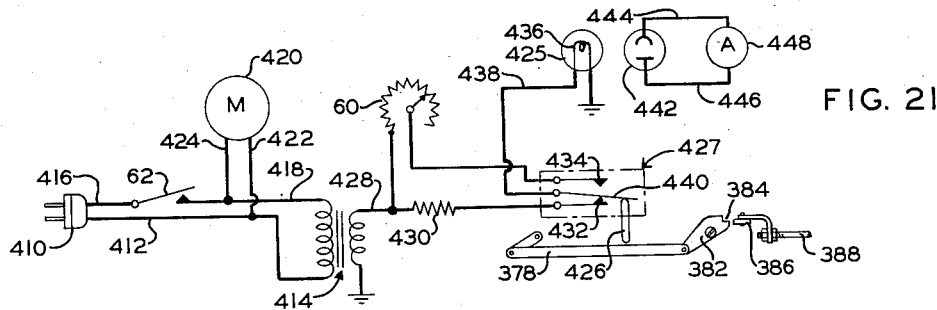
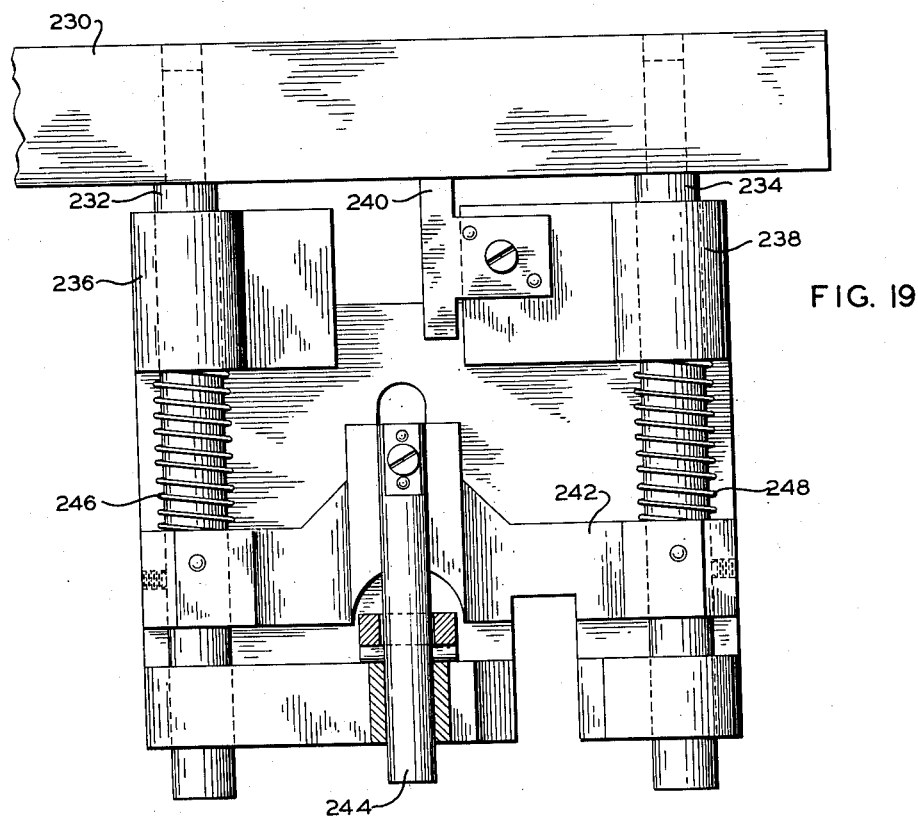
Inventor
HERMAN R. FREUND Inventor
HERMAN R. FREUND By Curtis, Morris & Safford
Attorneys March 23, 1954     H. R. FREUND     2,672,795
PORTABLE PHOTOCOMPOSING APPARATUS
Filed July 20, 1951     12 Sheets-Sheet 11
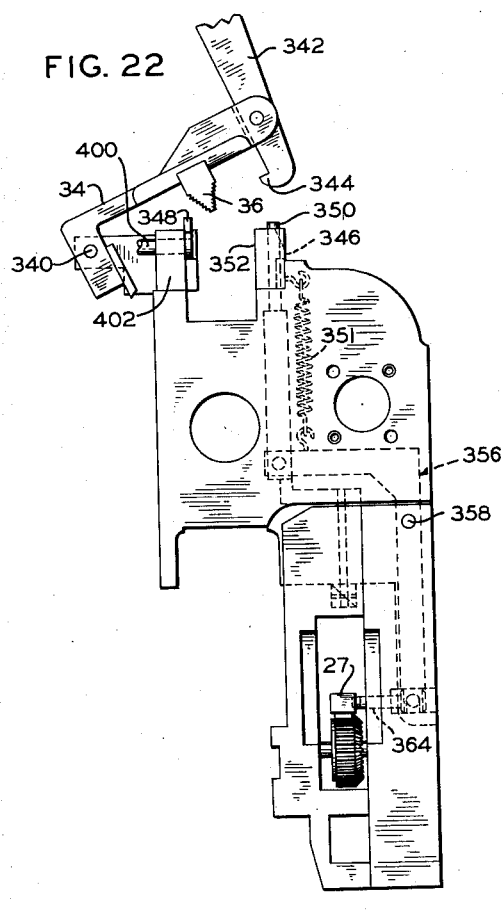
Inventor
HERMAN R. FREUND
By Curtis, Morris & Safford
Attorneys March 23, 1954 H. R. FREUND 2,672,795
PORTABLE PHOTOCOMPOSING APPARATUS
Filed July 20, 1951 12 Sheets-Sheet 12

Inventor
HERMAN R. FREUND
By
Curtis, Morris, & Safford
Attorneys

Patented Mar. 23, 1954

2,672,795

UNITED STATES PATENT OFFICE 2,672,795

PORTABLE PHOTOCOMPOSING APPARATUS

Herman R. Freund, Brooklyn, N. Y., assignor to Intertype Corporation, Brooklyn, N. Y., a corporation of New York Application July 20, 1951, Serial No. 237,696

6 Claims. (Cl. 95—4.5)

This invention relates generally to typographical machines for photographically producing on a sensitized film or paper lines of type matter from composed lines of individual character-bearing elements or matrices. The film when developed may be used, for example, in preparing printing plates that are particularly suited for use in the offset and gravure printing processes. The present invention is particularly concerned with a portable machine of this general type that is adapted to receive a hand-composed line of character-bearing matrices and produce photographically on a sensitized surface justified lines of type matter therefrom. The invention also relates to a novel hand-composing device especially adapted to be used with such a portable machine.

Photo-composing machines of the general type referred to above are disclosed in U. S. Patents 2,552,881 and 2,552,882 issued on May 15, 1951, to Freund et al. Such machines normally include a storage magazine for storing a supply of character-bearing matrices, a keyboard connected to release individual matrices from the magazine as desired, an assembler for assembling a composed line of matrices and distributor mechanism for distributing the matrices to the storage magazine after they have been photographed, all of which structures correspond generally with analogous parts of the older line-casting machines. In addition the photo-composing machines of the above-identified patents include justifying and photographing mechanism and conveying mechanism for transporting the character-bearing elements to photographing position and thereafter to the distributor mechanism for redistribution to the storage magazine.

The various elements of known photo-composing machines as outlined above are normally mounted on a heavy metal framework and since the aggregate weight of the machine and its frame is considerable, it cannot readily be moved from place to place. Moreover such machines are quite expensive to construct, transport and install and frequently require special foundations for their support.

In many cases, as outlined in detail below, keyboard composition of the matrices is either not essential or not practically possible and direct hand composition of the matrices is economically feasible and even advantageous. In accordance with the present invention, a desirable reduction in weight and cost is attained by eliminating the keyboard, distributing mechanism, heavy framework and certain other portions of the known photo-composing machine. A special type of hand composing device is provided which is adapted to cooperate with a modified justifying and photographing mechanism to give a unitary photo-composing machine that is very much lighter in weight than pre-existing machines of the same general type. Thus the machine of the present invention requires no special foundations for its support, and in fact may, if desired, be mounted on an ordinary desk.

The portable photo-composing machine disclosed herein is useful for a wide variety of purposes. For example, many of the oriental and middle eastern languages have alphabets composed of a very large number of individual characters, outstanding examples of such languages being Chinese and Japanese. In such cases, keyboard composition is wholly impractical and hand composition must be used. The present machine provides a convenient way of producing high quality composition in such cases at a reasonable cost. Along the same line the composition of mathematical and other scientific subject matter frequently requires the use of a large number of specialized characters and the present machine is especially useful for this type of work as well.

The present machine is also useful in connection with advertising composition where relatively small amounts of text are to be used in conjunction with illustrations. In such cases, special type faces are likely to be used and with the present machine flexibility and high quality composition can be readily achieved. Similarly the machine is useful in preparing various business forms such as ruled forms which may or may not contain small amounts of text thereon. An illustrative method of preparing such forms is disclosed in Freund application Serial No. 209,570, filed February 6, 1951.

The present machine is useful for a wide variety of special printing jobs such as greeting cards, matchbooks, labels and "stripping material," i. e. lines of text or single words to be applied to maps and the like. Moreover it is useful for composing display heads of the type which, when produced by type-casting methods require a special machine for their production. With the present machine, much higher quality composition can be achieved than with the special type-casting machines presently available for this purpose. Moreover the re-touching that is frequently required where display heads are produced from cast lead type is unnecessary with the present machine.

In certain cases the present machine can be usefully employed in conjunction with a group of keyboard-type photo-composing machines. Thus where a group of keyboard-type machines is operating on a production basis, the smaller machine can be conveniently used to compose corrected lines and thereby avoid interrupting the production schedule of the larger machines.

The many objects and advantages of the present invention can best be understood and appreciated by reference to the accompanying drawings which illustrate a portable photo-composing machine incorporating a preferred embodiment of the present invention and wherein:

Figure 1 is a general front elevation of the machine;

Figure 2 is a perspective view of one of the matrices;

Figure 3 is a fragmentary perspective view of the lower left-hand portion of the machine of Figure 1, showing the lower portion of the camera housing and film holder and the spring means associated with the line delivery lever and matrix elevator;

Figure 4 is a perspective view of the matrix composing device showing the relationship of the assembler slide and gauging member to the slotted support of the composing device, broken away and exploded to show the stop for limiting movement of the assembled slide and line of matrices into the elevator;

Figure 5 is a vertical section taken on the line 5—5 of Figure 3, showing the elevator and particularly the manner in which the elevator engages a line of matrices that are introduced therein by the assembler slide;

Figure 6 is a fragmentary front elevation of the assembler slide and associated parts showing the rear wall of the elevator and a line of matrices partially removed from the assembler slide by the elevator;

Figure 7 is a front elevation of the right-hand portion of the machine as shown in Figure 1, but showing on an enlarged scale the line-length adjusting mechanism and an index assembly to facilitate setting of the composing device;

Figure 8 is a top plan view of a portion of the line-length adjusting mechanism and showing the manner in which the gauging member of the composing device is positioned with respect to the line-length index to ensure proper relative adjustment of the assembler slide and gauging member;

Figure 20:
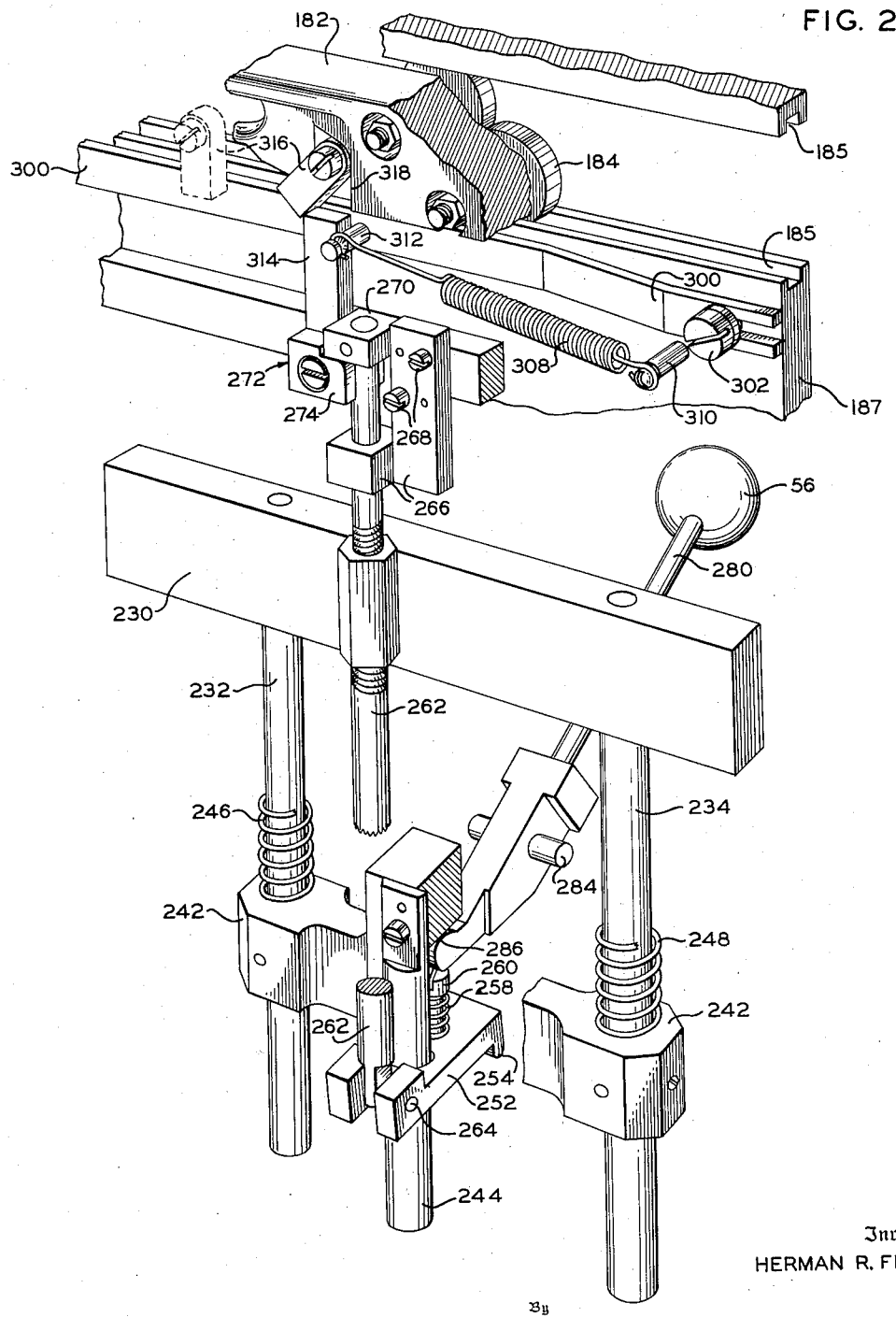
Figure 26:
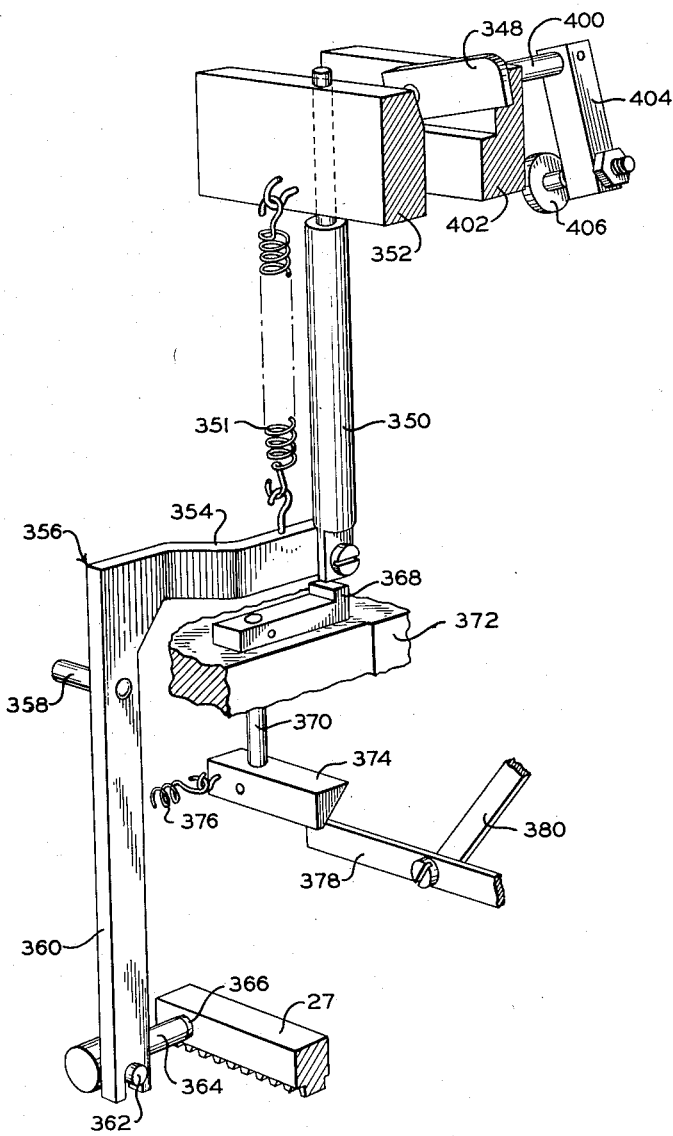

Figure 9 is a vertical section taken on the line 9—9 of Figure 8 except that in Figure 9 the composing device has been inserted in its channel, whereas in Figure 8 the channel is shown without the composing device therein. Figure 9 shows the slotted support of the composing stick in operative position in the machine and the assembler slide at its left-most position wherein it supports a line of matrices within the elevator;

Figure 10 is a broken vertical section taken on the line 10—10 of Figure 7 and showing the relationship between the various parts of the composing device and its channel as well as the drum scale and line-length index;

Figure 11 is an enlarged front elevation of the central portion of the machine as shown in Figure 1 and shows particularly the mechanism for automatically bringing the light source to full intensity during photographing of a line of elements;

Figure 12 is a top view of a portion of the light intensity regulating mechanism taken on the line 12—12 of Figure 11;

Figure 13 is a fragmentary elevation of the right-hand portion of the light intensity regulating mechanism of Figure 12;

Figure 14 is a front elevation of the actuating bar for the justification lock and shows the bar in a position corresponding to the unlocked condition of the justifying mechanism;

Figure 15 is a similar elevation of the actuating bar for the justification locking mechanism and shows the bar in the position it occupies when the locking mechanism has been conditioned to lock the justifying mechanism;

Figure 16 is a fragmentary perspective view of a portion of the line-follower showing the manner in which the line-follower release lever engages the line-follower;

Figure 17 is a vertical section taken on the line 17—17 of Figure 1 and showing the justification lever, the justification control rail supporting bar and details of the justification locking mechanism, all shown in line-receiving position, that is, prior to justification;

Figure 18 is a view similar to Figure 17 showing the parts in justifying position and the locking mechanism in locking position;

Figure 19 is a rear elevation of the structure shown in Figure 17 taken on the line 19—19 of Figure 17;

Figure 20 is a rear perspective view of the justification lever, portions of the justifying mechanism and portions of the justification locking mechanism, showing particularly the manner in which the actuating bar for the locking mechanism cooperates with the locking mechanism;

Figure 21 is a wiring diagram of the light intensity control circuit;

Figure 22 is a left-end view of the feed rack locking mechanism, its release, the camera starting lever, and the accumulator bar plate in raised position;

Figure 23 is an end view similar to Figure 22 except that the accumulator bar plate has been latched in its lower position to actuate the feed rack release and camera starting lever. In Figure 23 the line-follower and its supporting channel are shown in elevation;

Figure 24 is a fragmentary top plan view of the structure of Figure 22 with the accumulator bar plate removed;

Figure 25 is a fragmentary top plan view of the structure shown in Figure 23; and Figure 26 is a perspective view of the feed rack lock, the release therefor and the camera starting lever.

The machine disclosed in the present application is in many of its details substantially the same as the machine disclosed in Freund et al. Patent 2,552,882, and since no useful purpose would be served by repeating herein the rather lengthy description of these details, frequent reference will be made in the following description to this Freund et al. patent. As described in Patent 2,552,882, the characters to be photographed are mounted in matrices such as that shown in Figure 2 of the present application. Composition of the desired type matter is effected by assembling matrices bearing the proper characters into a line of desired length and then individually photographing on a sensitized surface the characters of successive matrices of the composed line to produce a line of type matter on the sensitized surface. The matrices have a thickness that is proportioned to the set-wise width of the characters they bear, and hence the matrix thickness can be used to regulate film movement to secure proper spacing of the characters in the composed line.

Brief description of machine

The operation of the machine will first be generally described with reference to Figure 1 of the drawings and thereafter various portions of the machine will be described in detail. As shown in Figure 1 the machine is mounted on the top of a desk generally designated 8. Referring particularly to the right-hand portion of Figure 1, in using the present machine a line of matrices M-1 is hand composed in a composing device 10 which is capable of being removed from the machine and inserted therein in a manner described in detail hereafter. The composed line of matrices M-1 is manually shifted to the left into an elevator 12 which is manually raised to an upper position at which it trips a line-follower release lever 14. As described in Patent 2,552,882, tripping of the lever 14, releases a line delivery lever 16 which is urged to the left by a spring 18 and is connected to a line-follower 20 that pushes the composed line of matrices from the elevator along a feed channel or track 22 to a justifying station 24. As the line-follower 20 reaches the justifying station 24 it engages and is latched to a line-length determining member 26 carried on a feed rack 27.

At the justification station 24 justifying mechanism generally designated 28 is provided which is similar to the mechanism disclosed in Freund application Serial No. 177,145, filed August 2, 1950, now Patent No. 2,645,168, of July 14, 1953, but differs therefrom in certain respects that are described in detail hereafter. At the justifying station 24 the mechanism 28 measures the difference between actual length of the composed line of matrices and the desired line length to determine what will hereafter be referred to as the line shortage, and modifies the movement of the film in such manner that this difference or shortage is distributed over the line of type matter produced on the film or over a selected portion thereof, all as described in the Freund application, Serial No. 177,145. As an incident of the justification measurement operation the composed line of matrices at station 24 is urged to the left against an end wall "C" that forms part of the camera housing.

When the justification measurement has been completed, the characters on the matrices are individually photographed by a camera mechanism generally designated 30 that includes a vertically movable film holder 32. To start the photographing operation an accumulator bar plate 34, shown at the top central portion of Figure 1 and carrying an accumulator bar 36, is manually lowered. As the accumulator bar plate 34 approaches its lower position, it actuates a clutch that starts various operating parts of the camera mechanism. As described in Patent 2,552,882, these operating parts include a pair of endless conveyors that transport the leading element of the line of matrices, i. e. the matrix abutting end wall "C," from the justifying station 24 upward to a photographing position, whereat the character on the matrix is photographed, and then to a discharging position from which it is discharged on the accumulator bar 36. Lowering of accumulator bar plate 34 also causes various shutters forming part of the photographing mechanism to start operating and releases the feed rack 27 for leftward movement. Feed rack 27 is connected through member 26 with line follower 20. Hence this leftward movement of the feed rack occurs in steps as each matrix reaches end wall "C" and is withdrawn from the composed line.

The feed rack 27, as described in Patent 2,552,882, is connected by a gear and shaft assembly 38 with a vertical rack 40 on which the film holder 32 normally rests. Thus the film holder 32 moves downward in a stepwise manner as each element is photographed. The amount of downward movement comprising each step of the film holder depends upon the setwise width of the character being photographed and also upon the line shortage referred to above. As explained in Freund application Serial No. 177,145, in certain cases, as for example where tabular matter is being composed, it is desirable that no justifying correction be applied to the tabular matter and hence during photographing of such tabular matter each step movement of the film holder 32 is proportioned only to the setwise width of the character being photographed.

Upon completion of the photographing of a line of matrices, the line-follower 20 is manually retracted to the right by means of a knob 42 secured thereto. This retraction of line-follower 20 moves delivery lever 16 to the right, i. e. to its position as shown in Figure 1, and also, through the medium of a chain 44, raises film holder 32 to its upper position. Feed rack 27 is also retracted, thus raising rack 40 to its upper position to support film holder 32 during the next photographing operation. Thereafter accumulator bar plate 34 is raised to disengage the clutch which interconnects the photographing mechanism and its drive, and to lock the feed rack 27. The matrices which have been discharged on accumulator bar 36 are removed and disposed of as desired. The composing device 10 provides a convenient means for removing the matrices from the bar 36.

The machine as shown in Figure 1 includes various adjusting members for adjusting the machine in various respects. All of these adjusting members are either disclosed in Patent No. 2,552,882 or will be described in detail hereafter. Beginning at the left-hand side of Figure 1, these adjusting members include a knob 46 whereby line-advancing movement of the film can be effected upon completion of the photographing of a line of elements; a lens adjusting dial 48 whereby the degree of magnification of the characters of the character bearing elements can be varied; a gear box 50 which is exchangeable with other gear boxes to vary the relationship between movement of feed rack 27 and movement of film holder 32; a release lever 52 which is movable to release gear box 50 from its gear and shaft assembly; a knurled disk 54 whereby the initial position of film holder 32 may be adjusted to provide for accurate alignment of the left margin of the column of type matter with different degrees of magnification; a vertically shiftable lever 56 for operating the justifying mechanism 28; a margin control lever 58 to provide for aligning a short line of type matter at either the left or right margin as desired; a switch 62 for turning on the motor that drives the photographing mechanism and also energizing the light source; a rheostat knob 60 (near the top of Figure 1) for adjusting the intensity of the light source used for photographing; a locking member 102 for locking the adjustable parts of composing device 10; and a hand wheel 64 which when rotated sets an index 66 relative to a drum scale 68 to indicate the point size of the desired line and also adjusts the line-length determining member 26 to the proper position.

Hand composing device

The hand composing device 10 is best shown in Figures 4, 6, 8, 9 and 10 of the drawings. Referring first to Figure 4, this device includes a slotted support generally designated 80 and comprising a base 82 having the longitudinally slot 84 therein, a relatively high rear wall 86 and a relatively low front wall 88. The base 82 and walls 86 and 88 form a channel within which is positioned an assembler slide 90 having a longitudinal slot 92 therein that registers with the slot 84, and an upstanding end wall 94. The slide 90 is provided with a curved right-hand end 96 to facilitate manual movement of the slide with respect to support 80.

Mounted on the assembler slide 90 there is an adjustable guide 98 having an upstanding wall 100 aligned with the wall 94 of slide 90. The guide 98 is adjustably secured to the slide 90 by means of a rotatable locking member 102 and a stepped shoe 104. Referring particularly to Figure 6, the locking member 102 is provided with a laterally extending handle 106 and a downwardly projecting pin 108 that is threaded into the shoe 104. The upper step 110 of shoe 104 slides in the slot 84 of support 80 and the lower step 112 provides a flange that prevents disengagement of slide 90 and guide 98 from support 80. The upper step 110 also provides a stop to limit movement of assembled slide 90 with respect to support 80 in a manner more fully described hereafter.

The steps 110 and 112 are of such a height that when the locking member 102 is rotated clockwise the guide 98 is securely fastened to the slide 90 but the slide 90 is freely slidable with respect to support 80. The guide 98 may be adjusted with respect to slide 90 by rotating locking member 102 counterclockwise to such an extent as to permit the pin 108 to slide freely in slot 92 of the assembler slide. The guide 98 and slide 90 are initially so adjusted as to provide a space between walls 94 and 100 equal to the desired line length. The manner of controlling this adjustment is described in the following section. When the desired spacing has been achieved, locking member 102 is rotated clockwise to fasten the guide and slide together securely and a line of matrices is hand composed in the space between the walls 94 and 100. The composed line of matrices is then inserted into the machine in a manner described hereafter.

Line-length adjusting mechanism

The line-length adjusting mechanism, which is best shown in Figures 7, 8 and 10 of the drawings, is generally similar to that disclosed in Patent 2,552,882. It includes a hand wheel 64, index member 66 and drum scale 68 previously referred to in connection with Figure 1. Referring particularly to Figures 8 and 10, hand wheel 64 has a forwardly extending handle 120 and on its rear face is provided with a bevel gear 122 that meshes with a second bevel gear 124 secured to a threaded rod 126. As best shown in Figure 10, the rod 126 is threaded through the index member 66, and the index member is provided with a forked end 128 that embraces a fixed guide rod 130, thereby preventing rotation of the index member with the threaded rod. Thus rotation of threaded rod 126 by hand wheel 64 moves index member 66 laterally with respect to drum scale 68.

As indicated in Figures 7 and 10, the drum scale 68 is provided around its periphery with a series of scales having point sizes marked thereon, and the drum scale may be rotated by means of a manual knob 132 to present the desired scale for cooperation with index member 66, all as more fully described in Patent 2,552,882. The threaded rod 126 (see Figure 7) is connected by a series of shafts and gears generally designated 134 with the line-length determining member 26, previously referred to in connection with Figure 1, and thus as the hand wheel 64 is rotated to cause index 66 to indicate the line length on drum scale 68, the line-length member 26 is automatically positioned to the desired line-length determining position.

Still referring to Figures 7, 8 and 10, the index member 66 and drum scale 68 are located in a housing 136, at the lower front left-hand portion of which there is provided a notched member 138 formed to receive the wall 94 of assembler slide 90 of the hand composing device. Referring particularly to Figure 8, in adjusting the guide 98 with respect to assembler slide 90, the wall 94 is inserted in notch 138 and the wall 100 of guide 98 is positioned opposite the index member 66. In this way the space between walls 94 and 100 can be made precisely equal to the desired line length.

Line delivery mechanism

When a line of matrices has been composed in the hand composing device 10, it is inserted in the machine in a manner now to be described. Referring particularly to Figures 8, 9 and 10, secured to the top of housing 136 is a channel member 150 which is attached to the housing in any suitable manner such as by means of the screws 152. As best shown in Figure 10, the channel member 150 is adapted to slidably receive the slotted support 80 of the hand composing device 10 which is retained in place in the channel member 150 by a plate 154 secured to the channel by the screws 156 (see Figure 8) and overlying the channel. As illustrated in Figure 7 of the drawings, the composing device 10 slides into channel member 150 until its left-hand end strikes an abutment 158 forming part of the elevator 12.

As previously pointed out in connection with Figure 1, the composed line of matrices is raised to the level of a feed channel 22 by an elevator 12, the construction of which is best shown in Figures 3, 5 and 6 of the drawings. As best shown in Figure 5, the elevator is of U-shaped cross-section and comprises a front plate 160 and a rear plate 162 spaced therefrom, the rear plate having at its lower edge a laterally projecting portion 164 by means of which the two plates are secured together. Secured to the front plate 160 there is a handle member 165 which facilitates raising of the elevator 12.

Referring to Figure 3, the projecting portion 164 of elevator 12 is connected by a link 166 to the forward end of lever 168 which is pivotally secured to the desk 8. A spring 170 secured to the desk 8 is also secured to an intermediate point of lever 168 in such manner that the spring exerts upward force on elevator 12. The tension of spring 170 is so selected that it almost, but not quite, counter-balances the weight of elevator 12, link 166 and lever 168. Thus the elevator 12 can be raised by light manual pressure, but when released descends of its own weight to its lower position.

Referring now to Figures 4, 5 and 6, the composed line of matrices is inserted into elevator 12 by manually grasping the curved end 96 of assembler guide 90 and urging the left-hand end of the assembled slide between the upper ends of plates 160 and 162 until the upper step 110 of shoe 104 engages the end of slot 84. The slot 84 is of such length that when it is engaged by the step 110 the composed line will be properly positioned within the elevator.

As shown in Figure 5, the matrices are provided with upper ears 172 and lower ears 174 that extend laterally beyond the sides of wall 94 of the assembler guide. The plates 160 and 162 of elevator 12 are provided with shelves 176 and 178 adapted to engage the lower ears 174 of the matrices, and are also provided with the shelves 180 and 181 respectively, adapted to engage and support the upper ears 172 of the matrices. Thus as the elevator is lifted the composed line of matrices is removed thereby from the assembler guide 90, as particularly shown in Figure 6.

Reverting now to Figure 1, as disclosed in Patent 2,552,882, elevator 12 as it reaches its upper position engages and rocks the line-delivery release lever 14, thereby releasing line-follower 20 and line-delivery lever 16 for leftward movement. The relation between lever 14 and line-follower 20 is further shown in Figures 14-16. The line-delivery lever and line-follower are interconnected through a frame 182, having wheels 184 that engage upper and lower horizontal tracks which serve to guide the line-follower along a horizontal path. The mounting of the line-follower is further disclosed in Figure 23 where it is shown that the wheels 184 run in confronting tracks or channels 185 formed in a supporting frame 187 of generally C-shaped cross-section (see also top portion of Figure 20). Reverting again to Figure 1, as line-follower 20 moves to the left it moves the composed line of matrices from elevator 12 along the feed channel 22 to the justifying station 24 where the line-follower engages and is stopped by the line-length determining member 26.

Referring now to Figure 3, the line-delivery lever 16 is pivotally mounted on desk 8 at 186 and is urged in a counterclockwise direction by a relatively heavy spring 188 that is connected at one end to desk 8 and at its other end to the delivery lever at a point spaced from pivot 186. The delivery lever 16 is provided near pivot 186 with an arm 190 connected by a link 192 to a conventional damping device 194 which damps the movement of the delivery lever and prevents excessive impact of the line-follower 20 on member 26 at the end of the delivery stroke. It may also be noted that a second damping device 196 is mounted on desk 8 and connected to the film holder 32. Damping device 196 serves to damp the downward stepwise movement of film holder 32 described previously in connection with Figure 1.

Justifying mechanism and lock therefor

The justifying mechanism is generally shown in Figure 1 and portions of the mechanism are shown in detail in Figures 15 and 17-20. It is generally of the same type as that disclosed in Freund application Serial No. 177,145 filed August 2, 1950. Thus as shown in Figure 1 it includes a vertically movable rack 200 carrying a laterally adjustable rider 202 and a stationary rack 204 carrying a laterally adjustable rider 206. Interconnecting the two riders there is a control rail 208 that is pivoted to rider 202 and slidably pivoted to rider 206.

Referring now particularly to the left-hand portion of Figure 15 wherein the line-follower 20 is shown in the position it occupies after most of a line of matrices, designated M-2, has been removed from the justifying station for photographing, the line-follower includes a pair of cooperating line-compacting members shown in dotted lines. One of the line-compacting members is a vertically movable wedge 210 that is mounted for vertical sliding movement in suitable guides in the follower 20 and carries at its lower end a roller 212. The wedge 210 is provided with a slot 214 engaged by a pin 216 that cooperates with slot 214 to limit the range of vertical movement of the wedge.

The other line-compacting member is a horizontally slidable plunger 218 that is urged to the right by a spring 220. The plunger 218 is provided with a head or ram 222 adapted to bear against the right-hand end of the line of matrices M-2 at the justifying station and carrying, within follower 20, a roller 224 adapted to engage the sloping surface 226 of wedge 210. The construction is such that upward movement of wedge 210 causes plunger 218 to move to the left and compact the matrices of the composed line against the end wall "C," previously identified. The amount of movement of plunger head 222 is equal to the line shortage referred to above, and hence the upward movement of wedge 210, which produces this leftward movement of plunger 218, is also a measure of the line shortage. The roller 212 and wedge 210 are moved upwardly by the rider 202 of movable rack 200 by mechanism which will presently be described.

As explained in my application Serial No. 177,145, the line shortage thus measured is used to modify movement of the film holder in such manner as to produce a justified line of type matter on the film. In my said prior application, it is pointed out that by proper adjustment of the riders 202 and 206 it is possible to distribute this justifying correction over either the entire line or over a pre-selected portion thereof. However, for purposes of the present discussion it will be sufficient to consider the case where the justifying correction is distributed over the entire line. For this case the rider 202 is so positioned on rack 200 that the pivotal connection of the rider and control rail 208 is aligned with the axis of roller 212. As shown in Figure 1, the control rail 208 is initially horizontal, but when the rack 200 and rider 202 are moved upwardly by mechanism presently to be described the control rail 208 assumes an angle that is proportional to the line shortage.

Upon completion of the line-compacting operation the photographing apparatus is started and the feed rack 27 released. Thereupon matrices are transported from the left end of the composed line at end wall "C" to photographing position, and as each matrix is removed the line-delivery lever spring 188 moves the line-follower 20, line-determining member 26 and rack 27 to the left and through mechanism 38 lowers the film holder 32 a corresponding amount. As the follower 20 moves to the left, the roller 212 rides downwardly along the control rail 208, thus lowering wedge 210. Roller 224 rides along surface 226 and the head 222 of plunger 218 is gradually retracted toward the body of the follower. As a result of this retraction of plunger 218, each time a matrix is removed for photographing, the follower and feed rack 27 move to the left an amount slightly greater than the thickness of the removed matrix and this small increment of movement is transmitted to the film holder in such manner that the justifying correction is distributed over the length of the photographed line.

The mechanism for moving rack 200 and rider 202 upwardly is best shown in Figures 17 to 20 of the drawings. As shown at the top of Figure 17, the movable rack 200 is secured to a crossbar 230 which (see Figure 19) is supported on a pair of vertical rods 232 and 234. The rods 232 and 234 are vertically slidable in holes in the bosses 236 and 238, respectively, which are fixed to the frame of the machine in a manner not shown in the drawings. The boss 236 is provided with a stop 240 which limits downward movement of crossbar 230. Below the bosses 236 and 238 the rods 232 and 234 are interconnected by a yoke 242 which carries a downwardly extending locking rod 244. A pair of springs 246 and 248 surround the rods 232 and 234, respectively, and are interposed between the yoke 242 and the bosses 236 and 238, respectively, in such manner that they urge crossbar 230 downwardly against stop 240.

Reverting to Figure 17, the locking rod 244 passes through a hole 250 in a locking member 252 that is provided at its left end with a downwardly projecting ledge 254 through which it rests on a fixed abutment 256. The locking member 252 is urged in a clockwise direction around the pivotal contact between ledge 254 and abutment 256 by a spring 258 that bears against the upper surface of the locking member 252 and is held in place by a screw 260 which extends through the spring and locking member and is threaded into the abutment 256.

Referring now to Figure 20, the end of locking member 252 remote from ledge 254 is forked to receive the lower end of a control rod 262 which is pivotally connected to the locking member 252 by a pin 264. Near its upper end the control rod 262 passes through a guide block 266 that is secured to the main frame of the machine in any suitable manner such as by the screws 268. At its extreme upper end the control rod is provided with a block 270 that slides along an adjacent edge of guide block 266.

The upper portion of control rod 262 cooperates with a bell-crank lever 272 pivotally secured to the frame of the machine. Bell-crank 272 includes an arm 314 by means of which the bell-crank is actuated in a manner described hereafter and an arm 274 that is forked to partially embrace the control rod 262 between the portion of guide block 266 through which the rod passes and the upper block 270. The construction is such that counterclockwise rotation of lever 272 causes arm 274 to bear against the under side of block 270 to raise rod 262 and clockwise rotation of lever 272 permits rod 262 to move downward.

Reverting now to Figure 17, lifting of the cross bar 230 and its associated rack 200 is effected by means of a manually operated control lever 280 provided at its outer end with the knob 56 previously referred to and pivoted by means of a pin 284 to the frame of the machine. At its inner end the control lever 280 has a rounded boss 286 that bears against the under surface of the central portion of yoke 242. Thus, when the knob 56 is manually grasped and depressed, the yoke 242 is moved upwardly against the action of springs 246 and 248, and through rods 232 and 234 lifts the crossbar 230 which carries rack 200.

During the period when a line of elements is being photographed (and assuming that a justifying correction is to be made) the crossbar 230 is locked in its upper position by co-operative action of the locking rod 244 and locking member 252. As clearly shown in Figures 17 and 18, the hole 250 in locking member 252 is somewhat larger in diameter than the locking rod 244. When the parts are in the position shown in Figure 17 with the locking rod 62 in its upper position and the locking member 252 substantially horizontal, no locking action takes place. Under these conditions if the knob 56 is depressed to raise crossbar 230 and then released, the crossbar will immediately be returned to its lower position in contact with stop 240 by the action of springs 246 and 248. The parts can be conditioned for locking by lowering rod 262 to the position shown in Figure 18, whereupon locking member 252 pivots about ledge 254 until the upper front edge and lower rear edge of hole 250 come in contact with and press against points on the surface of control rod 244. With the parts in the position shown in Figure 18 it is evident that upward movement of locking rod 244 with respect to locking member 252 will tend to pivot the locking member counter-clockwise and thus relieve the pressure between the upper and lower edges of hole 250 and the locking rod; whereas if an effort is made to move the rod 244 downwardly with respect to locking member 252, the pressure between the parts will immediately increase to prevent such movement. Thus if the parts are in the position indicated in Figure 18 and the yoke 242 is moved upwardly by depression of knob 56 it will remain locked in its upper position upon release of knob 56, and until locking member 252 is rotated counterclockwise by upward movement of rod 262.

The control rod 262 is lowered to condition the parts for locking by the line-delivery movement of the line-follower and is raised to prevent locking of the parts by the return movement of the line-follower at the completion of the photographing operation. The manner in which this movement of the control rod is effected will now be described. Referring particularly to Figure 14, it has been previously pointed out that the control rod 262 is moved up and down by pivotal movement of bell-crank 272. The bell-crank 272 is in turn actuated by an actuating bar 300 mounted for lateral sliding movement on the main frame of the machine. The left-hand end of bar 300 is forked to embrace a pin 302 secured to the main frame, and the right-hand end of bar 300 is provided with a slot 304 which surrounds a pin 306 secured to the main frame of the machine. The bar 300 is urged to the left by a spring 308 secured to the main frame at 310 and connected at its other end to the pin 312 which is secured to the bar 300. Leftward movement of the actuating bar 300 is limited by pin 306 engaging the right-hand end slot 304. The longer arm 314 of bell-crank 272 is positioned to engage the pin 312 of bar 300, and thus as the bar 300 moves horizontally it rotates bell-crank 272 to raise or lower control rod 262. The arm 314 is normally maintained in contact with pin 312 by the weight of control rod 262 and its associated parts as well as by spring 258. The relation between pin 312 and arm 314 of bell-crank 272 is well shown in Figure 20.

Referring now to the upper portion of Figure 20, the movable frame 182 on which the line-follower 20 is mounted has pivotally secured to the rear surface thereof a swingable detent 316, movement of which in a counterclockwise direction as viewed in Figure 20 is limited by the wall 318 of frame 182. Reverting to Figure 14 and particularly the right-hand portion thereof, the detent 316 is shown positioned against the wall 318 of frame 182 and in engagement with a rearwardly extending arm 319 of an adjusting member 320 that is adjustably secured to the bar 300. Member 320 is positioned for sliding movement along the rear surface of the end of bar 300 and is provided with a slot 321 that is engaged by a guide pin 322 fixed to bar 300. Member 320 is adjustably secured to bar 300 by means of screw 323 that extends forwardly through slot 321 and is threaded into bar 300, thereby permitting relative lateral adjustment of arm 319 and bar 300 and hence adjustment of the right-hand position of bar 300.

With the parts in the position shown in Figure 14 the line-follower 20 and its associated frame 182 are held against leftward movement by the line-delivery release lever 14, and the detent 316 through arm 319 holds actuating bar 300 at its right-hand position. Bar 300 through pin 312 maintains bell-crank 272 cocked to the right as shown and thus arm 274 of the bell-crank maintains the control rod 262 in its upper position and prevents locking of the justifying mechanism.

When the line-delivery release lever is rotated by upward movement of elevator 12, the line-follower 20 and its associated frame 182 move to the left to the position shown in Figure 15. With the initial movement of line-follower 20 detent 316 moves away from arm 319, thereby permitting bar 300 to move to the left under the influence of spring 308 and bell-crank 272 is rotated counterclockwise to lower control rod 262 and condition the locking mechanism for locking. As indicated in dotted lines in Figure 15 and also shown in Figure 20, the swingable detent 316 engages and then passes over the top of arm 314 of bell-crank 272 as the line-follower 20 approaches the end wall "C."

At the end of the photographing operation the line-follower 20, as more fully described hereafter, is withdrawn to its right-hand position as shown in Figure 14, and this withdrawal of the line-follower 20 and its associated frame 182 causes the detent 316 to engage the arm 314 of bell-crank 272 to cause it to pivot clockwise and raise control rod 262 thereby unlocking the justifying mechanism. As the line-follower reaches its right-hand position, the detent 316 again engages arm 319 of bar 300 and draws the bar to its right-hand position as shown in Figure 14. The pin 312 then maintains bell-crank 272 cocked to the right to maintain the control rod 262 in its upper or unlocked position.

The justifying apparatus of the present machine, like that of application Serial No. 177,145, is constructed to permit arrangement of short lines at either the left margin of the column of type matter (flush left operation), or at the right margin of the column of type matter (flush right operation), as well as to permit the normal justification of a full line. As explained in application Serial No. 177,145, in order to achieve flush right operation the cross bar 230 is left in its lower position, and this type of operation can be achieved in the present machine merely by not depressing the lever 56. In the initial description of Figure 1 a brief reference was made to the lever 58 which in its upper position provides for normal justifying operations and in its lower position provides for flush left operation. In the present machine flush left operation is achieved in essentially the same manner as described in application Serial No. 177,145, namely by bolting the control rail 208 to the crossbar 230 so that as the crossbar 230 is lifted the control rail remains horizontal.

Since the structure for bolting the control rail to the crossbar 230 is the same as that disclosed in my said prior application, it is not fully shown in the drawings of the present case. However, a portion of this structure is shown in Figure 17. Referring to that figure, the lever 58 is indicated in phantom view and is mounted on a rotatable shaft 330 to which is secured a sprocket 332 which is engaged by a chain 334. When the lever 58 is moved from its upper to its lower position, sprocket 332 rotates to move chain 334 to slide a bolt (not shown) carried in crossbar 230 into engagement with control rail 208 so that when the lever 280 is depressed to raise crossbar 230 the control rail 208 rises horizontally. Referring to Figure 15, when the control rail is raised the line of elements M-2 is compacted as previously described, but upon release of feed rack 27 the roller 212 travels along a horizontal path and hence no justifying correction is applied to movement of the film holder.

When the lever 58 is raised to its upper position, the chain 334 moves in the opposite direction to withdraw the bolt from control rail 208 to permit the normal justifying operation as previously described.

*The photographing apparatus*

The photographing apparatus of the present machine is essentially the same as that disclosed in Patent 2,552,882 and hence is not shown in detail in the drawings nor described in detail herein. In general the photographing apparatus includes a pair of endless chains for raising the matrices of the line M-2 individually to a photographing position at which the characters thereon are photographed and then to a discharging position from which they are discharged on the accumulator bar 36 (see Figure 1). The photographing apparatus also includes lens means and movable shutter means which with the conveyor chains and other moving parts of the photographing apparatus are driven through a clutch by a continuously operating electric motor. In the patented machine this clutch is actuated by a cam; whereas in the present machine actuation of the clutch to start the photographing mechanism is effected by manual movement of accumulator bar plate 34 in a manner which will now be described.

As previously indicated in the "Brief description" of the machine, lowering of the plate 34 not only moves the camera drive clutch to engaged position but also releases the feed rack 27. The structure for effecting these operations is shown in Figures 22 to 26 of the drawings. Referring first to Figure 22, the plate 34 is hinged at its rear edge to the main frame of the machine at 340 and is provided at its front edge with a pivoted handle 342. The lower end of handle 342 is provided with a hook 344 that is adapted to engage a latch member 346 (best shown in Figure 11) to maintain the plate 34 in its lower closed position.

As the plate 34 is lowered it engages and depresses both a pivoted lever 348 and the upper end of an axially slidable rod 350 which is mounted for sliding movement in a bar 352 secured to the main frame of the machine.

Referring now to Figure 26 of the drawings, the rod 350 is pivotally connected at its lower end to the horizontal arm 354 of a bell-crank 356 that is pivoted at 358 on the main frame of the machine. The arm 354 of bell-crank 356 is connected to the lower end of a spring 351 which is secured at its upper end to bar 352 and is biased to urge rod 350 upwardly and bell-crank 356 counterclockwise. The vertical arm 360 of bell-crank 356 has a forked lower end that embraces a projection 362 on a slidable feed rack locking pin 364 which is adapted to engage a hole 366 in the feed rack 27. Thus spring 351 tends to maintain locking pin 364 in hole 366 until rod 350 is depressed.

It is important that the feed rack 27 remain locked against movement except when the photographing operation is going on, and structure is provided for preventing premature or inadvertent unlocking of the feed rack. Still referring to Figure 26, near the lower end of rod 350 an interponent 368 is provided which is positionable under the lower end of rod 350 to prevent downward movement of the rod. The interponent 368 is secured to a vertical shaft 370 which extends through a frame member 372 in such manner that the interponent can rotate in a horizontal plane to a position under the rod 350 or to a position spaced from the rod 350. At its lower end the shaft 370 is provided with a wedge-shaped member 374 that is normally urged in a counterclockwise direction by a spring 376 to cause interponent 368 to be positioned under rod 350. The wedge member 374 is moved clockwise to move interponent 368 out from under rod 350 by a bar 378 in a manner now to be described.

Referring particularly to Figure 11, the bar 378 is pivotally connected at spaced points to the lower ends of a pair of parallel links 380 and 382 which are in turn pivotally supported at their upper ends on the main frame of the machine in such manner that the bar 378 is free to swing laterally. The line-follower 20 is provided with a forwardly extending arm 21 which, as the line follower approaches line-length-determining member 26, lifts and passes under a latch 29 pivotally mounted on member 26, thereby latching the line-follower to member 26. The latch 29 is aligned with bar 378 and when it is raised by arm 21 of the line-follower it engages bar 378 and swings the bar upward to the left. The bar 378 thereupon engages and rotates wedge member 374 as previously described to condition the feed rack releasing mechanism to permit the feed rack to be released when cover plate 34 is lowered.

In order to maintain the bar 378 in its left-hand position until the line-follower has been retracted after completion of the photographing operation, detent mechanism is provided which is shown in Figures 11, 12 and 13. As best shown in Figure 11, the upper end of link 382 is provided with a shoulder or notch 384 which (see Figure 12) is adapted to be engaged by a pivoted arm or detent 386. The arm 386 is pivotally connected between its ends to one end of an axially slidable rod 388 that is mounted for sliding movement in the brackets 390 and 392. Interposed between bracket 390 and the left end of rod 388 and surrounding the rod there is a spring 394 biased to urge the rod to the left. Near its right end the rod 388 has secured thereto a block 396 which (see Figure 13) has a downwardly extending finger 398 adapted to engage the upper portion of line-follower 20. The manner in which the finger 398 engages the top of line-follower 20 is particularly shown in Figure 14. When the line-follower is in its right-hand position, the parts are located as shown in Figure 11 with detent 386 disengaged from link 382.

It is apparent that as the line-follower 20 starts its line delivery movement the rod 388 is released for leftward movement under the influence of spring 394, and the front end of arm 386 will bear resiliently against link 382 at a point somewhat below notch 384. As it approaches the justifying station 24 the line-follower causes latch 29 to swing bar 378 to the left and as an incident of this swinging movement the notch 384 of link 382 is lowered slightly to permit the front end of arm 386 to engage the notch and thereby maintain the bar 378 in its left-hand position.

Reverting now to Figure 26, the arm 348 is secured to a shaft 400 mounted for rotation in a fixed frame member 402. At its rear end the shaft 400 is provided with an arm 404 having secured to its lower end the clutch-operating button 406. When the plate 34 carrying accumulator bar 36 is lowered to matrix-receiving position, arm 348 is depressed and arm 404 and bottom 406 swing clockwise to cause the camera drive clutch to move to engaged position by means of mechanism described in Patent 2,552,882 but not shown or described herein.

The structure shown in Figure 26 is also shown in orthographic views 22 through 25. In Figures 22 and 24 the parts are shown with the plate 34 in raised position, the locking pin 364 engaged with the feed rack 27 and the interponent 368 positioned below rod 350. In Figures 23 and 25 the plate 34 is in its lower position, the feed rack locking pin 364 is shown withdrawn and interponent 368 is shown as swung away from the lower end of rod 350.

Electrical circuit

The electrical circuit for the present machine is shown in Figure 21 of the drawings. Referring to Figure 21, a conventional plug 410 adapted to be plugged in an ordinary electrical socket is connected by a conductor 412 to one side of the primary of a transformer 414, and by a conductor 416, switch 62 and conductor 418 to the other side of the primary of transformer 414. The switch 62 is the manually operated starting switch shown in Figure 1 and referred to in the "brief description" of the machine. The reference character 420 designates the camera operating motor which is connected to conductors 412 and 418, respectively, by the conductors 422 and 424, respectively.

The secondary of transformer 414 supplies energy to a lamp 425 which provides a light source for the photographing operation. The physical location of the lamp 425 is shown in Figures 11 and 23 of the drawings. In order to extend the life of the lamp, means are provided whereby the lamp operates at low intensity at all times except when actually in use for performing photographing operations. Referring particularly to Figure 11, mounted for swinging movement on the upper pivot of link 382 there is a switch actuating member 426 which, when the bar 378 swings to the left, is moved upwardly thereby to operate a switch 427 to increase the energy supplied to the lamp 425.

Reverting now to Figure 21, one side of the secondary of transformer 414 is grounded and the other side is connected by a conductor 428 to a resistor 430 which is in turn connected to a fixed contact 432 of switch 427. The other fixed contact 434 of switch 427 is connected through rheostat 60 and conductor 428 with the secondary of transformer 414. The physical location of rheostat 60 is indicated in Figures 1 and 11 of the drawings.

The lamp 425 is provided with a filament 436, one side of which is grounded and the other side of which is connected through a conductor 438 with a movable contact 440 of the switch 427. The arrangement is such that when the swingable bar 378 is in its lower position movable contact 440 engages fixed contact 432 and the lamp is supplied with energy through resistor 430 and operates at a relatively low level. On the other hand when bar 378 is moved upwardly to the left by line-follower 20, movable contact 440 engages fixed contact 434 and lamp 425 is supplied with energy through rheostat 60 and operates at a high intensity level. The light intensity level of the lamp during photographing can be adjusted by adjustment of rheostat 60. The light intensity of lamp 425 is measured by a selenium cell 442 which is connected by conductors 444 and 446 to an ammeter 448, the physical location of which is indicated in Figure 1. It is evident that as the line-follower 20 is withdrawn at the end of the photographing operation rod 388 will be retracted to disengage detent 386 from link 382. Bar 378 will then swing downward to its lower position and movable contact 440 will engage fixed contact 432 thereby reducing the energy supplied to lamp 425 until the next forward line-delivery movement of the line-follower occurs.

Operation of machine

The operation of the machine should be largely apparent from the foregoing description but it seems desirable to summarize briefly herein the various steps of the operation of the machine in the order in which they occur. The machine is initially adjusted for the point size of the type matter to be produced and the line length that is desired. It is apparent that the order in which these initial adjustments are made is not critical. Referring to Figure 1, these adjustments include (a) setting the drum scale 68 to bring into co-operative relation with the index 66 a scale having the proper point side thereon; (b) rotating the hand wheel 64 to set index member 66 to indicate the desired line length on the scale 68. Rotation of this hand-wheel, as previously described, also positions the line-length determining member 26 to the proper position on feed rack 27. (c) Adjust lens dial 48 for proper point size. (d) Set margin adjusting dial 54 to proper point size. (e) Insert the proper gear box 50 in film holder actuating train. (f) Adjust the justifying mechanism 28 by setting riders 202 and 206 on racks 200 and 204, respectively. Also set justification conditioning lever 58 to the proper position. After these adjustments have been completed the starting switch 62 is operated to start motor 420 and energize lamp 425.

Ordinarily the next step is to set the assembler slide 90 and guide 98 of the composing device 10 by inserting the wall 94 of the assembler slide in notch 138 and locating wall 100 of the guide 70 98 opposite index member 66. The slide 90 and guide 98 are then clamped together by rotation of clamping member 102 and a line of matrices composed on the assembler slide. The composing device 10 is then inserted in channel member 150 until the left end of slotted support 80 engages abutment 158. Thereafter, the curved end 96 of assembler slide 90 is grasped to move the composed line of matrices into the elevator 12 until the upper step 110 of shoe 104 engages the left end of slot 84, thus properly positioning the composed line M-1 within the elevator.

The elevator 12 is then manually raised to its upper position at which it trips the release lever 14, and delivery lever 16 and line-follower 20 move the composed line to justifying station 24. The initial leftward movement of the line-follower 20 in addition to removing the composed line from elevator 12 performs two additional functions: (a) It releases the justification lock actuating bar 300 for a small leftward movement to condition the justification locking mechanism so that it will lock the justifying mechanism when the control lever 56 is depressed; and (b) it releases the slidable rod 388 to permit the arm 386 to bear against the upper end of link 382 (see Figure 11). As the line-follower reaches the justifying station, bar 378 is swung upward to the left thereby permitting the detent arm 386 to engage notch 384 in link 382 to maintain the bar 378 in its lefthand position. Movement of the bar actuates electric switch 427 to increase the light intensity of the lamp 425 and also conditions the feed rack locking mechanism so that it can be subsequently unlocked.

When the line-follower reaches the line-determining member 26, it latches therewith and the composed line M-2 is then positioned at the justifying station 24 between the line-follower and the end wall "C." The knob 56 is depressed to measure the line shortage and the accumulator bar plate 34 is then lowered and latched. Lowering of the plate 34 starts the camera drive and also unlocks feed rack 27 to permit leftward movement thereof.

The photographing operation which is fully described in Patent 2,552,882, then takes place. The matrices are moved upwardly in sequence to a photographing position by feed chains and then raised to a higher level at which they are discharged on the accumulator bar 36. The film holder moves downward in steps the size of which is controlled by the extent of movement of feed rack 27. The size of each step is determined by two factors, namely the thickness of the elements removed from the head of line M-2 and the justifying correction that is applied.

When the line-length determining member 26 reaches end wall "C," the line-follower is automatically unlatched therefrom. The knob 42 of the line-follower is then grasped and the line-follower returned manually to its right-hand position. As this retractive movement of the line-follower begins (see Figure 15), the detent 316 engages the arm 314 of bell crank 272 to unlock the justifying mechanism and justifying control knob 56 returns to its upper inactive position. As explained in Patent 2,552,882, the line-follower during its retractive movement repositions the feed rack 27. Referring to Figure 11, as the line-follower approaches its right-hand position it engages a bracket 460 which supports the right-hand end of the feed rack 27 and in this way draws the feed rack to the right and repositions it for the next photographing operation.

As the line-follower reaches its right-hand position it draws the justification lock actuating bar 300 to the right (see Figure 14) and also draws slidable rod 388 to the right (see Figure 12) to release swingable bar 378 and allow it to return to its lower position. Thereupon switch 427 is actuated to reduce the intensity of illumination of lamp 425. Also (see Figure 26) spring 376 urges interponent 368 counterclockwise against the lower end of rod 350.

When the line-follower has been returned to its right-hand position and latched by upward movement of the right end of release lever 14, accumulator bar plate 34 is raised, thereby disengaging the camera drive clutch and releasing the feed rack locking bolt mechanism to permit the bolt 364 to enter the feed rack hole 366 and lock the feed rack. Raising of plate 34 also permits spring 351 to raise rod 350, and spring 376 then moves interponent 368 under rod 350, thereby preventing lowering of plate 34, starting of the photographing mechanism and release of feed rack 27 until the line-follower has positioned another line at the justifying station. The discharged matrices are removed from accumulator bar 36 and returned to storage. The knob 46 on film holder 32 is manually actuated to advance the film and the machine is then ready for insertion of another composed line of matrices.

From the foregoing description it is apparent that the present invention provides a structure capable of achieving the several objectives set forth at the beginning of the present specification. It is of course to be understood that the structure described is illustrative only and that numerous changes therein can be made within the scope of the invention as defined in the appended claims.

I claim:

1. In portable photo-composing apparatus including photographing means having a movable film holder containing a sensitized film for photographing the characters of composed lines of character-bearing elements to produce lines of type matter on said film; justifying means including a track for supporting a composed line of said elements at a justifying station, means for gauging said line of elements at said station to measure the amount of line shortage, and means for modifying the movement of said film holder in accordance with the measured line shortage to apply a justifying correction to said lines of type matter; means for supplying a composed line of elements to said track; and line-follower means for moving said line of elements along said track to said justifying station; said line-gauging means including a justification control rail movable into an operative position for co-operation with said line-follower to effect line-justifying action during movement of said line-follower through said line-justifying station, and a supporting bar pivotally supporting said control rail, mechanism for operating said line-gauging means comprising a manually operable lever mechanically connected to said supporting bar to raise said bar and thereby bring said control rail into said operative position and locking means for locking said supporting bar in its upper position, said locking means being conditioned to lock said supporting bar upon actuation of said manual lever by movement of said line-follower toward said justifying station and being releasable by retraction of said line-follower from said justifying station.

2. Apparatus according to claim 1 and wherein said locking means includes a locking rod effectively secured to said supporting bar, a locking member surrounding said rod and cantable into a gripping relation with said rod which locks said rod against downward movement but permits relatively free upward movement of said rod and supporting bar, and a lock-operating bar movable in one direction to cant said locking member into said gripping relation and in the opposite direction to cause said locking member to release said locking rod.

3. Apparatus according to claim 2 and wherein said lock-operating bar is actuated by a spring-biased actuating bar, releasable by initial movement of said line-follower to move said locking member toward locking position and retracted by retraction of said line-follower to move said locking member toward release position.

4. In portable photo-composing apparatus including photographing means having a movable film holder containing a sensitized film for photographing the characters of composed lines of character-bearing elements to produce lines of type matter on said film; justifying means including a track for supporting a composed line of said elements at a justifying station, means for gauging said line of elements at said station to measure the amount of line shortage and means for modifying the movement of said film holder in accordance with the measured line shortage to apply a justifying correction to said lines of type matter, said modifying means including a feed rack mechanically connected to said film holder; means for supplying a composed line of said elements to said track; and line follower means for moving said line of elements along said track to said justifying station; locking mechanism for said feed rack comprising a locking member movable into or out of engagement with said feed rack to lock or unlock said feed rack, a manually operable member, a mechanical linkage interconnecting said manual member and said locking member, an interponent normally biased into engagement with said mechanical linkage to prevent operation of said manual member, and means for disengaging said interponent from said mechanical linkage, said disengaging means being actuated by said line-follower as it approaches said justifying station.

5. In portable photo-composing apparatus including photographing means having a movable film holder containing a sensitized film for photographing the characters of composed lines of character-bearing elements to produce lines of type matter on said film; and justifying means including a track for supporting a composed line of said elements at a justifying station, means for gauging said line of elements at said station to measure the amount of line shortage and means for modifying the movement of said film holder in accordance with the measured line shortage to apply a justifying correction to said lines of type matter, said modifying means including a feed rack mechanically connected to said film holder; locking mechanism for said feed rack comprising an element accumulator member movable from an inactive position to an accumulating position wherein it is adapted to receive the elements of said line after they have been photographed; a locking member engageable and disengageable with said feed rack to lock and unlock said rack, and a lock-actuating member mechanically connected to said locking member, said lock-actuating member being engageable by said accumulator member as it moves to said accumulating position to cause said lock-actuating member to unlock said rack.

6. In photo-composing apparatus including a camera and associated operative mechanism having a movable film holder containing a sensitized film for photographing the characters of composed lines of character-bearing elements to produce lines of type matter on said film; justifying apparatus including a track for supporting a composed line of said elements at a justifying station, a line-gauging device for measuring said line of elements at said station to determine the extent of line shortage, and means for modifying the movement of said film holder in accordance with the measured line shortage to apply a justifying correction to said lines of type matter; an elevator adapted to support a line of elements and shiftable between a lower position and an upper position in alignment with said track; line follower means for moving said line of elements from said elevator along said track to said justifying station; conveyor means for conveying said elements from said track to an optical axis of said camera for photographing; and a light source positioned on said optical axis, said line-gauging means including a justification control rail movable into an operative position for cooperation with said line follower to effect line justifying action during movement of said line follower through said line justifying station, and a supporting bar pivotally supporting said control rail; said modifying means including a feed rack mechanically connected to said film holder; mechanism for rendering said photo-composing apparatus more readily portable comprising, in combination with the foregoing components of the apparatus, mechanism for delivering a composed line of elements to said elevator including a channel aligned with the element-receiving position of said elevator and a hand composing device slidable in said channel to a position adjacent to the element-receiving position of said elevator, said composing device having an element-supporting member movable into said elevator at said element-receiving position to transfer a composed line of elements from said composing device to said elevator; a manually operable lever mechanically connected to said supporting bar to raise said bar and thereby bring said control rail into said operative position; an electrical switch operable to increase the supply of energy to said light source and thereby increase its light intensity, said switch being engageable by a part of said line follower as it moves to said justifying station to operate said switch; and locking mechanism for said feed rack comprising a locking member engageable with said rack, a manually operable member mechanically connected to said locking member to selectively move said locking member into or out of engagement with said feed rack.

HERMAN R. FREUND.

References Cited in the file of this patent

UNITED STATES PATENTS

| Number | Name | Date |
| --- | --- | --- |
| 1,553,920 | Smothers | Sept. 15, 1925 |
| 1,571,170 | Robertson | Jan. 26, 1926 |
| 2,391,021 | Klingberg | Dec. 18, 1945 |
| 2,402,751 | Huebner | June 25, 1946 |
| 2,552,882 | Freund | May 15, 1951 |